(12) United States Patent
Kufner

(10) Patent No.: US 10,337,586 B2
(45) Date of Patent: Jul. 2, 2019

(54) TENSIONING UNIT

(71) Applicant: IDEEMATEC Deutschland GmbH, Wallerfing (DE)

(72) Inventor: Johann Kufner, Aholming (DE)

(73) Assignee: IDEEMATIC DEUTSCHLAND GMBH, Wallerfing (DE)

( * ) Notice: Subject to any disclaimer, the term of this patent is extended or adjusted under 35 U.S.C. 154(b) by 323 days.

(21) Appl. No.: 14/723,010

(22) Filed: May 27, 2015

(65) Prior Publication Data

US 2015/0345590 A1 Dec. 3, 2015

(30) Foreign Application Priority Data

May 28, 2014 (DE) .................... 20 2014 102 513 U

(51) Int. Cl.
*F16G 11/12* (2006.01)
(52) U.S. Cl.
CPC ....... *F16G 11/12* (2013.01); *Y10T 403/32819* (2015.01)
(58) Field of Classification Search
CPC ..... Y10T 403/32819; Y10T 403/32827; Y10T 403/29–299; Y10T 403/295297; F16G 11/12; F16F 1/46; F16F 3/00; F16F 3/02; F16F 3/08; F16F 3/10; F16F 1/04; F16F 1/12; F16F 1/121; F16F 1/125; F16F 1/128; F16F 15/046; F16F 2232/08; F16F 2236/06; E05D 13/1207; F16C 1/22; F16C 1/223; B60T 7/108
USPC .......................... 403/145, 146, 43–48; 267/73
See application file for complete search history.

(56) References Cited

U.S. PATENT DOCUMENTS

| | | | | |
|---|---|---|---|---|
| 3,051,519 A * | 8/1962 | Sudeikis | ................ | B60D 1/182 280/482 |
| 3,354,550 A * | 11/1967 | Leschinger et al. | .. | B43L 13/045 33/438 |
| 4,012,967 A * | 3/1977 | Warren | ...................... | F16C 7/04 403/43 |
| 4,311,220 A * | 1/1982 | Maurer | ................... | B66F 17/00 188/170 |
| 6,161,981 A * | 12/2000 | Dehlin | ...................... | F16B 7/06 403/43 |
| 7,237,977 B2 * | 7/2007 | Kay | ....................... | B60P 7/0838 403/43 |
| 7,264,219 B2 * | 9/2007 | Kicher | ................... | G09F 17/00 16/221 |
| 7,771,416 B2 * | 8/2010 | Spivey | ............... | A61B 1/00133 600/106 |

(Continued)

FOREIGN PATENT DOCUMENTS

| | | | |
|---|---|---|---|
| CA | 2775547 A1 * | 10/2013 | ............. F16K 17/06 |
| DE | 19852977 | 10/1999 | |
| WO | 2012/034873 | 3/2012 | |

*Primary Examiner* — Amber R Anderson
*Assistant Examiner* — Nahid Amiri
(74) *Attorney, Agent, or Firm* — Price Heneveld LLP

(57) ABSTRACT

A tensioning unit for pull elements such as cables includes a tensioning element and a spring element, wherein the tensioning element and the spring element are arranged in a row, a length of the tensioning element is shortened in such a manner that the tensioning element has a pretension, the pretension is designed to increase the length of the tensioning element, and wherein the direction of the length enlargement of the tensioning element is directed away from the spring element.

15 Claims, 3 Drawing Sheets

(56) References Cited

U.S. PATENT DOCUMENTS

| | | | | |
|---|---|---|---|---|
| 8,506,142 B2* | 8/2013 | Macke | ............... | B60Q 1/0491 |
| | | | | 362/382 |
| 8,607,661 B2* | 12/2013 | Geisler | ............... | B60T 11/046 |
| | | | | 188/196 B |
| 8,816,187 B1* | 8/2014 | Stribling | ............... | H02S 30/20 |
| | | | | 126/570 |
| 8,925,260 B2* | 1/2015 | Conger | ............... | H01L 31/042 |
| | | | | 52/146 |
| 9,214,892 B2* | 12/2015 | White | ............... | H02S 30/20 |
| 2007/0196196 A1* | 8/2007 | Schorling | ............... | F16B 21/04 |
| | | | | 411/555 |
| 2008/0134828 A1* | 6/2008 | Lee | ............... | B60T 7/108 |
| | | | | 74/501.6 |
| 2012/0090176 A1* | 4/2012 | Stancel | ............... | H02S 20/00 |
| | | | | 29/890.033 |

* cited by examiner

TENSIONING UNIT

BACKGROUND OF THE INVENTION

The present invention relates to a tensioning unit, particularly for pull elements such as cables, and a cable arrangement.

The present invention is used for example in the field of solar module technology and in the field of tracking devices for solar modules in particular. Pull elements or ties, such as ropes and cables, for example made from wire, are used here for pivoting the solar modules and the solar module tables. Furthermore, they are used if e.g. (support) structures or arrangements have to be tensioned or stiffened. It is problematic in this case, however, that the pull elements can only fulfil their object if they have a corresponding tension, which must be neither too low nor too high. The tension of the pull elements can vary however for example due to weather influences or construction-determined influences, particularly when moving the tracking devices, so that there is the risk that the pull elements are either over-tensioned or have too little tensioning. Tensioning units known from the prior art are however either designed to maintain a tension or to provide a yielding or a length compensation, but not to fulfil both functions. Tensioning units of the type being discussed can be used e.g. in tracking devices, as described in WO 2012/034873.

Therefore, it is the object of the present invention to provide a tensioning unit, particularly for pull elements, such as cables, as well as a cable arrangement for tracking devices for solar modules in particular, which provide a basic tensioning and length compensation in a simple manner.

SUMMARY OF THE INVENTION

According to the invention, a tensioning unit, particularly for pull elements/ties/binding elements such as ropes or cables, comprises a tensioning element and a spring element, wherein the tensioning element and the spring element are arranged in a row, and wherein a length of the tensioning element can be shortened in such a manner that the tensioning element has a pretension, wherein the pretension is designed to increase the length of the tensioning element and wherein the direction of the length enlargement of the tensioning element is directed away from the spring element.

This configuration advantageously makes it possible for one or two pull elements, which are connected to or via the tensioning unit, to be tensioned or re-tensioned, wherein a basic tensioning is provided via the spring element in a mounting state. In this case, mounting state designates a basic state of the tensioning unit, that is to say the state, in which the tensioning unit is mounted for example (in a cable arrangement or the like), but does not "operate" further, in the sense that it provides length compensation for example. The spring element has a length, which can be shortened. Thus, a certain yield can be provided by the spring element, in the event that the pull element(s) are additionally tensioned. By contrast, in the mounting state, the length of the tensioning element is shortened in such a manner that the pretensioning is built up, which pretensioning is designed to increase the length of the tensioning element. As a result, it is possible to advantageously react to one or both of the previously mentioned tensioning element lengthening. This expediently takes place via the pretensioning or via the length enlargement thereby possible, which is directed away from the spring element.

The spring element and the tensioning element are arranged in series, which means that the spring element and the tensioning element are arranged successively or adjacent to one another. This does not mean that the spring element and the tensioning element must touch directly, however. Thus, an intermediate washer or the like can for example be arranged between the spring element and the tensioning element, which can be used for force transmission from the spring element to the tensioning element or vice versa. In other words, a force flow is advantageously ensured from the spring element to the tensioning element and from the tensioning element to the spring element, if necessary also via one or several intermediate washer(s). In a preferred embodiment, the tensioning unit is designed to tension one or two pull elements, particularly cables, chains or wire cables, or keep the same tensioned.

In a preferred embodiment, the arrangement is such that a first pull element is connected to the spring element in such a manner that the same is compressed or shortened if the first pull element is loaded with tension. The tensile force of the pull element is converted to a compressive tension at the tensioning unit. The length of the spring element is consequently reduced. A second pull element is advantageously connected to the tensioning unit in such a manner that the length of the spring element can likewise be reduced if a tensile force acts on the second pull element. In this case also, the tensile force of the pull element is converted to a compressive force. The pull elements are therefore attached in such a manner that tensile stresses or tensile forces on the pull elements act as compressive forces on the tensioning unit and therefore on the tensioning element and the spring element. The spring element can therefore be compressed or the length thereof can be shortened by means of a tensile stress both on the first and on the second pull element. This is enabled by means of the position of the force introduction regions, which is described more precisely in the following. Basically, one of the pull elements or if necessary also a fixed point is connected to the tensioning unit in such a manner that the pull element conducts its force "directly" to the spring element, whilst the other pull element or if appropriate a fixed point conducts the force thereof to the spring element via the tensioning element and/or a boundary element, which is explained further in the following. The word "directly" is only to be understood to mean that no tensioning element is arranged between the spring element and the pull element. The tensioning element is preferably designed to increase and to reduce the length thereof. This makes it possible for the pull elements to be re-tensioned. To this end, the tensioning element advantageously has the pretensioning in the mounting state, which is designed to increase the length of the tensioning element.

Increasing the length of the tensioning element allows a slackening of the tension, thus in particular a length enlargement of the first and/or second pull element is compensated by the tensioning unit or the tensioning element. Thus, a constant tension in the first and/or second pull element can be maintained. It is understood that the tensioning unit does not have to be connected to two pull elements, such as (wire) cables for example. The tensioning unit can expediently be connected to a pull element on the one hand and to a fixed body on the other hand. In this case, the tensioning unit is designed to tension only one pull element.

The tensioning element is maximally pretensioned in the mounting state. This means that the tensioning element has reached a minimum length. As a result, it is also possible to transmit the compressive force to the spring element via the tensioning element. The spring element expediently has no or only a small length change, thus as little pretensioning as possible due to shortening, in the mounting state. The maximum pretensioning of the tensioning element advantageously takes place during the installation of the tensioning unit, wherein the actual pretensioning primarily takes place in that a spring stiffness or spring constant of the tensioning element is considerably smaller than a spring stiffness (or spring constant) of the spring element. Corresponding spring stiffnesses to be used are also mentioned in the following.

Preferably, the tensioning unit comprises a boundary element, which is designed to delimit the length reduction of the tensioning element. In a preferred embodiment, the boundary element is constructed as an essentially tubular sleeve, which extends within the tensioning element. It is understood that the boundary element can also be arranged around the tensioning element or outside or next to the same. Expediently, the boundary element itself has a length, which essentially corresponds to a minimum length of the tensioning element in the (maximally) compressed state or is slightly larger. It is decisive that although, in the mounting state, the length of the tensioning element is minimised, the force of the pull element is not forwarded via the tensioning element, but rather via the boundary element or at least mainly via the boundary element to the spring element for example. Without the boundary element, there would be a risk that the tensioning element is destroyed in the event of too strong a pressure loading, which corresponds to tensile loading of the pull element(s).

In one embodiment, the boundary element is constructed and arranged in such a manner that it can be supported on the previously mentioned intermediate washer, which is arranged between the spring element and the tensioning element. The intermediate washer forms a stop both for the boundary element and for the spring element and the tensioning element, so to speak. Both the tensioning element and the boundary element are preferably supported on the spring element. A further intermediate washer is expediently provided, which is arranged opposite the previously mentioned intermediate washer, that is to say at the other end of the tensioning element or the boundary element. Both the tensioning element and the boundary element are therefore arranged between the intermediate washers, wherein a minimum distance of the intermediate washers from one another is delimited by the boundary element. In a particularly preferred embodiment, washers according to DIN 125 with an inner hole diameter of approximately 10.5 mm are used as intermediate washers. This corresponds to washers for an M10 thread size. An external diameter of the washers preferably lies in a range from approximately 20 mm. Intermediate washers with not a round, but rather e.g. with a polygonal cross section, can also be used. It is understood that for the sake of simplicity, two identically constructed intermediate washers are used. However, washers with different dimensioning can likewise be used. This may be necessary, in particular, if a diameter of the spring element deviates significantly from a diameter of the tensioning element. A thickness of the intermediate washer(s) advantageously lies in a range from approximately 1 to 4 mm, particularly preferably in a range from approximately 1.5 to 3.5 mm.

In a preferred embodiment, the tensioning element is a coil spring, which can advantageously be loaded both with pressure and with tension. It is understood that the same would be destroyed, if it is compressed beyond a permitted amount, particularly if it is e.g. compressed or shortened in such a manner that the individual windings are pressed together. As described above, this is expediently prevented by the boundary element, however. A wire thickness of the coil spring is advantageously approximately 3 mm. An internal diameter advantageously lies in a range from approximately 11 to 16 mm, an external diameter advantageously lies in a range from approximately 15 to 20 mm. It is understood that the dimensions of the tensioning element and the intermediate washers used have to be adapted to one another. The tensioning element advantageously has a length of approximately 25 mm in the mounting state. In an unloaded state, the tensioning element advantageously has a length of approximately 41 mm. It is understood that other commercially available spring types, e.g. an evolute spring, can also be used.

The spring element is preferably a compression spring. In a preferred embodiment, the spring element is formed by one or a plurality of disc springs, particularly by a packet of disc springs. A disc spring is understood to mean a conical annular bowl, which can be loaded in the axial direction. The force introduction and transmission advantageously takes place along the inner edges of the disc springs. A packet or a column of disc springs is advantageously used. In this case, the individual disc springs can advantageously be connected in series or in parallel. In a particularly preferred embodiment, the packet or the column of disc springs is formed by ten disc springs, which are connected in series. Disc springs of DIN 2093 type, which have an internal diameter of approximately 12 mm, and external diameter of approximately 34 mm and a wall thickness of approximately 1.5 mm, are advantageously used. Likewise, the packet can also be formed by disc springs of different types, that is to say by disc springs which have different spring forces. Likewise, the use of a single disc spring is also possible. Alternatively, an elastomer or a packet or a series of elastomers or the like can also be used instead of a packet of disc springs or one disc spring. Likewise, a coil spring could be used, which is then advantageously provided with a corresponding run-out or length limit, which prevents a forbidden length enlargement of the spring element.

In a preferred embodiment, a spring force of the spring element is larger than a spring force of the tensioning element.

Expediently, the spring force of the tensioning element lies in a range from approximately 100 to 400 N, particularly preferably in a range from approximately 250 to 350 N, wherein the spring force of the spring element preferably lies in a range from approximately 500 to 2700 N, particularly preferably in a range from approximately 2000 to 2500 N.

Thus, the tensioning element is expediently designed to counteract a length change with a force in a range from approximately 100 to 400 N. In a preferred embodiment, the tensioning element is designed to counteract a length change with a force from approximately 250 to 350 N.

A length change of the tensioning element advantageously lies in a range from approximately 15 to 25 mm, particularly preferably in a range from approximately 20 mm. In this case, "length change" basically means the travel or the distance, which the tensioning element or else the spring element experiences compared to the unloaded (maximum) state thereof. A basic tensioning is advantageously maintained by the spring element, whilst the tensioning element is primarily used for compensating length changes of the pull element or the pull elements, that is to say can compensate "unforeseen" or "unplanned" length changes.

Such unforeseen length enlargements may happen if the pull element derails. It is then in danger of getting tangled up and the whole support structure may be completely destroyed, for example during strong wind. Thus, the tensioning element having a long length change or spring stroke, i.e. a long maximum elongation, but preferably a smaller spring force or spring constant than the spring element, acts as a safeguard, because it lengthens and thereby provides sufficient tension on the pull element to keep the cable arrangement in operation until the unforeseen length change can be repaired. In the normal condition, the length change of the tensioning unit is to be as small as possible, so that forces acting on the tracking device do not build up into strong oscillations, possibly even at resonance frequency, which may damage the whole tracking device/ support structure. Therefore, the spring element preferably has a high spring force/spring constant in order to counteract any unwanted oscillations, but a small length change. For example, the spring constant of the spring element is higher than 800 N/mm, preferably in a range of 1800 to 10.000 or 20.000 N/mm, or in some embodiments in a range of 5000 to 30.000 N/mm. When the pull element derails or the function is in any way disturbed and the pull element lengthens, the tensioning element gets active to compensate the lengthening, and then also to prevent the build-up of any oscillations on the pull element. Thus, preferably, the tensioning element has a longer spring stroke or length change, for example 1.5 to 20 times or 1.875 to 8.333333 or preferably 3.125 to 5 times, e.g. 4 times as long as the maximum length change (maximum elongation) of the spring element. The spring constant of the tensioning element is for example less than 500 N/mm or less than 200 N/mm, for example in a range of 5 to 80 N/mm. In an embodiment of the invention, the spring element has a short spring stroke and a high spring force or spring constant, whereas the tensioning element has a long spring stroke (longer than the spring element) and a comparatively low spring force or spring constant (lower than the spring element).

A maximum occurring length change of the spring element expediently lies in a range from approximately 3 to 8 mm, particularly preferably in a range from approximately 5 mm. Preferably, the spring element is designed to counteract a length change with a force in a range from approximately 500 to 2700 N, particularly preferably in a range from approximately 2000 to 2500 N.

Alternatively, both a plurality of spring elements and/or also tensioning elements with different spring stiffnesses can preferably be connected one after the other, in order to provide spring characteristics, which do not have a linear, but rather e.g. a progressive or degressive spring characteristic. Of course, spring (types) which inherently provide corresponding (non-linear) spring characteristics, as is known e.g. from correspondingly wound coil springs, can also be used for the tensioning element and/or the spring element.

The tensioning unit expediently comprises two force introduction regions, which are designed to introduce a retaining and/or tensile force into the tensioning unit, wherein the force introduction regions are arranged in such a manner that a tensile and/or retaining force can be introduced into the spring element via both force introduction regions. The position of the force introduction regions is such in this case that the retaining or tensile forces coming from the pull elements are converted into compressive forces at the tensioning unit. To this end, the two force introduction regions are arranged offset to one another to a certain extent, which means that the force introduction region of a left pull element for example is arranged to the right of the force introduction region of a right pull element and vice versa. The one force introduction region is expediently arranged on the tensioning element or joined there, whilst the other force introduction region is arranged on the spring element or joined there. Preferably, the force introduction region is constructed on the spring element in an essentially circular and/or annular manner, whilst the force introduction region on the tensioning element is constructed in an essentially punctiform manner.

The tensioning unit advantageously comprises an inner transmission element, which is arranged inside the spring element and the tensioning element, wherein the inner transmission element comprises a setting mechanism, which can be used e.g. for length change of the tensioning element. In a preferred embodiment, the inner transmission element is a rod-shaped element, e.g. made from metal, which is arranged inside the spring element and the tensioning element. The setting mechanism is advantageously constructed in that the inner transmission element comprises a thread. The thread diameter is preferably M10. The setting mechanism is complemented in that a threaded nut with a corresponding thread diameter is screwed on the thread, in order to displace at least one of the previously discussed intermediate washers and be able to pretension the tensioning element. The inner transmission element is likewise preferably also formed by the pull element, on which a corresponding thread is pressed. It is understood that the tensioning element can first be pretensioned if it is installed—e.g. in a cable arrangement.

The tensioning unit expediently comprises an external transmission element, which is arranged outside the spring element and the tensioning element, wherein the inner transmission element can be moved relatively to the outer transmission element, namely via the spring element and/or the tensioning element. Preferably, the external transmission element is bent e.g. from a metal sheet. Ultimately, the external transmission element is used to start the force introduction or introduce the retaining or tensile force of a pull element or a fixed point, such as e.g. a fixed body, into the spring element. In this case, the shape of the external transmission element enables the conversion of a tensile force of a pull element connected thereto into a compressive force, which can compress or shorten the spring element. By contrast, the inner transmission element is used to introduce the force of a further pull element or a fixed point so to say from the interior, via the tensioning element, into the spring element. The position and shape of the inner transmission element allow the tensile force of the pull element connected thereto to be converted into a compressive force, which can compress or shorten the spring element or also the tensioning element. Ultimately, this arrangement also makes it possible for the pretensioning of the tensioning element to tension both pull elements (if the tensioning unit is connected to two pull elements).

A guide element is expediently connected to the inner transmission element, which guide element is adapted to an (inner) shape of the outer transmission element in such a manner that a preferably axial guiding of the inner transmission element is enabled. The guide element is advantageously constructed as a square washer according to DIN 436 with a wall thickness of approx. 4 mm and a side length of approx. 40 mm. A further nut is advantageously arranged on the inner transmission element, which is designed to arrest the square washer on the inner transmission element together with the previously discussed nut. As already mentioned, the outer transmission element is preferably bent from a metal sheet or the like, so that a square washer is expediently suitable in this case for a guide. For example, in the event that the outer transmission element is formed from a tube or the like, it is understood that the guide element in this case preferably has a round cross section. No limits are placed on the shape and diversity in this regard.

According to the invention, a cable arrangement, particularly for tracking devices for solar modules, comprises at least one pull element, which is connected to a tensioning unit according to one of the preceding claims. It is understood that all advantages and features of the tensioning unit according to the invention apply for the cable arrangement according to the invention and vice versa.

Further advantages and features result from the following description of preferred embodiments of the tensioning unit according to the invention and the cable arrangement according to the invention, with reference to the attached drawings. Individual features of the individual embodiments can in this case be combined with one another in the context of the invention.

DETAILED DESCRIPTION OF THE PREFERRED EMBODIMENTS

Figure 1:
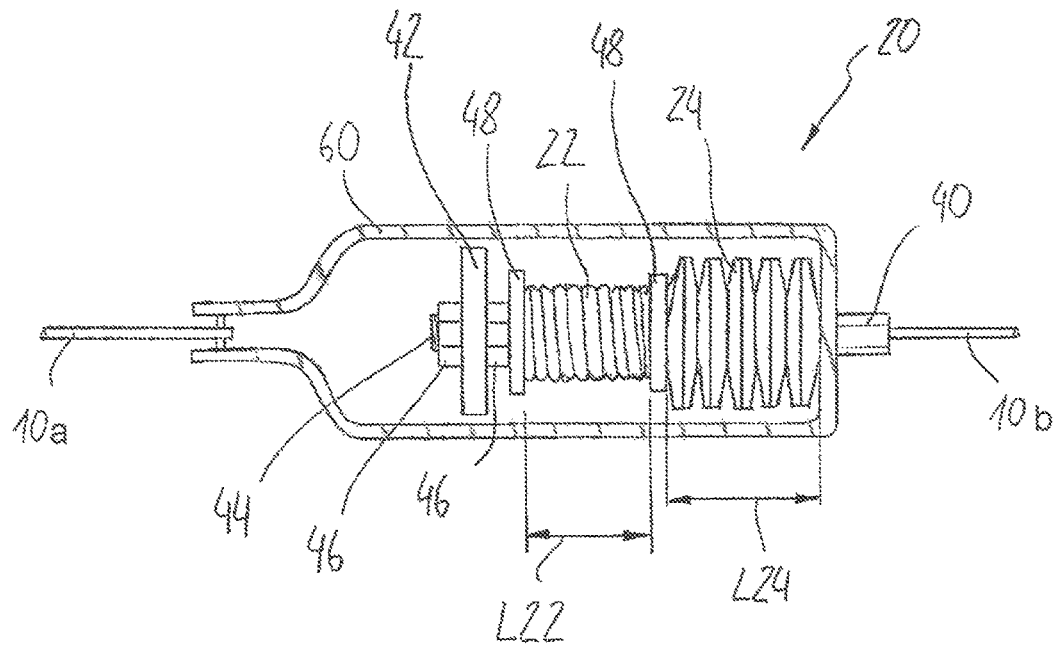
FIG. 1: shows a view of a preferred embodiment of a tensioning unit in a mounting state.

FIG. 1 shows a tensioning unit 20, which is arranged between two pull elements 10a, 10b. The left pull element 10a is arranged on a spring element 24 via an external transmission element 60, which is of essentially bow-shaped construction. The spring element 24 consists of ten disc springs in a series connection. A tensioning element 22 is arranged next to the spring element 24 or in series with the same. The tensioning element 22 is in turn arranged between two intermediate washers 48. The tensioning element 22 is constructed as a coil spring and maximally pretensioned in a mounting state shown in FIG. 1. In this state, it has a length L22, which is measured between the two intermediate washers 48. Arranged within the tensioning element 22 is a boundary element, which cannot be seen in FIG. 1, however, as the tensioning element 22 or the coil spring is completely pretensioned and the windings make it impossible to see "inside". Nuts 46 are provided in order to apply e.g. the pretensioning and in order to arrange a guide element 42 on an inner transmission element 40. The nuts 46 engage into a corresponding thread 44, which is present on the inner transmission element 40. The spring element 24 in turn has a length L24. If there is a pull on the right pull element 10b or a tensile or retaining force is built up, this is transmitted via the inner transmission element 40 to the left intermediate washer 48 and from there via the boundary element, which is not illustrated, and possibly via the tensioning element 22 by means of the right intermediate washer 48 to the spring element 24. In this case, the length L24 of the spring element 24 would then be shortened. The same behaviour occurs if there is a pull on the left pull element 10a. The difference only lies in the fact that the force of the left pull element 10a is transmitted via the external transmission element 60 to the spring element 24, so that the length L24 thereof experiences a corresponding shortening. Ultimately, both pull elements 10a, 10b are indirectly supported with respect to each other via the tensioning unit 20.

Figure 2:
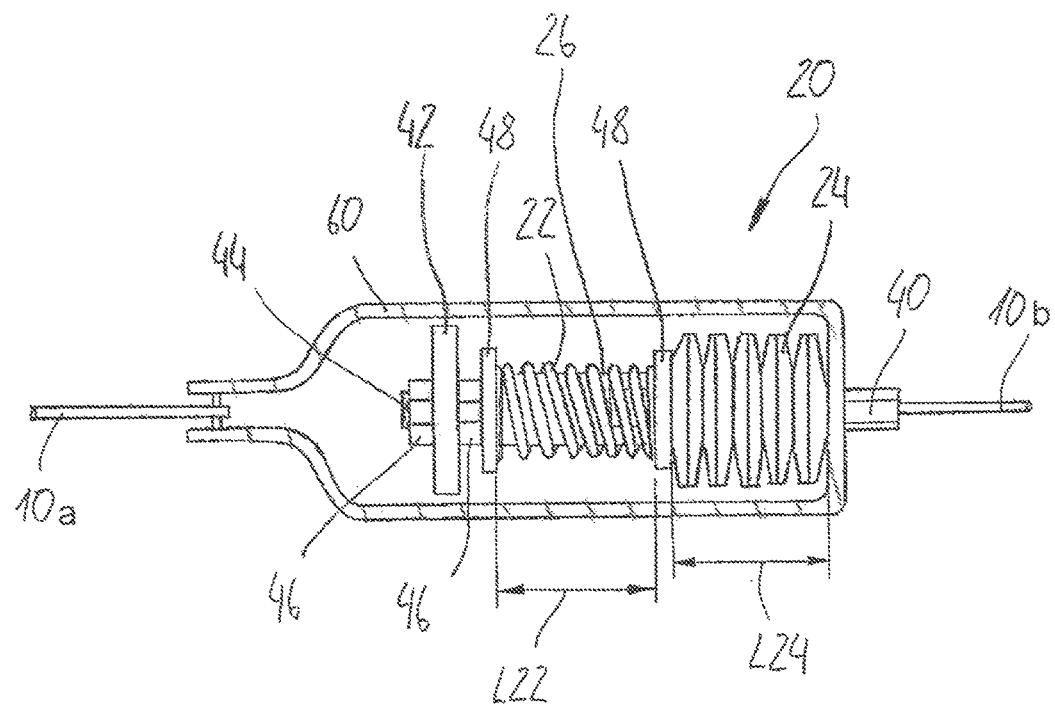
FIG. 2: shows the tensioning unit from FIG. 1, whereby a length of the tensioning element is enlarged.

FIG. 2 shows the tensioning unit illustrated in FIG. 1 in a state, in which the tensioning element 22 is elongated compared to FIG. 1, e.g. because the tensile stress on the pull elements 10a, 10b has fallen. In other words, the length L22 of the tensioning element 22 is larger in FIG. 2 than in FIG. 1. This leads to the fact that within the tensioning element 22, the boundary element 26, which has already been discussed, can now be seen somewhat. Advantageously, it is possible as a result to compensate length changes, particularly length enlargements of the pull elements. In other words, a re-tensioning therefore takes place.

Figure 3:
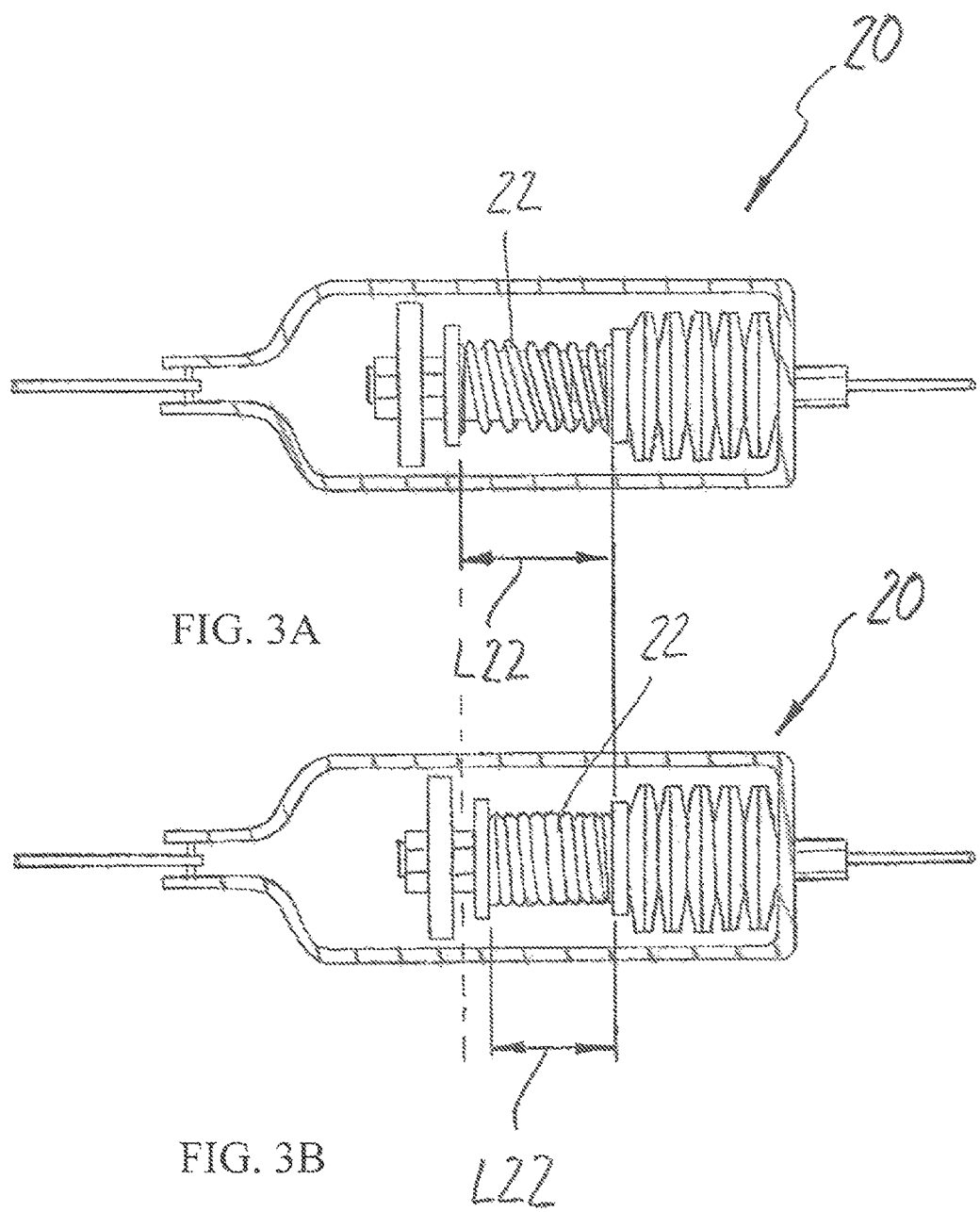
FIGS. 3A and 3A: shows the embodiment of the tensioning unit according to FIGS. 1 and 2 as a comparison.

FIGS. 3A and 3B show the tensioning unit 20 of FIGS. 1 and 2, wherein the length compensation enabled via the tensioning element 22 should be shown.

Figure 4:
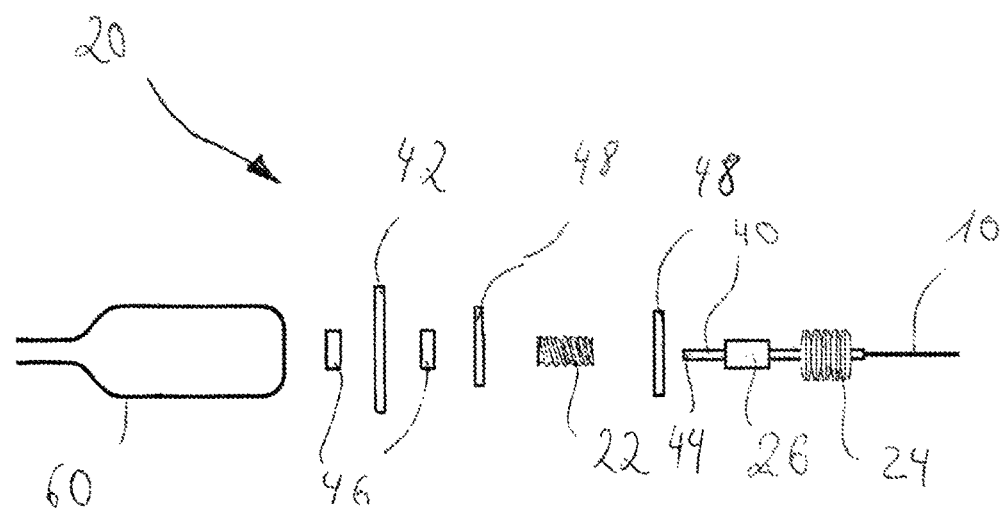
FIG. 4: shows an exploded illustration of a preferred embodiment of a tensioning unit.

FIG. 4 shows an inner transmission element 40 in an exploded illustration, here a rod or sleeve, on which a boundary element 26 and a spring element 24, formed from a packet of disc springs, is arranged. The inner transmission element 40 is connected to a cable 10. Intermediate washers 48 and a tensioning element 22 and a guide element 42 can be guided via the inner transmission element 40 and arrested or correspondingly pretensioned via nuts 46. The previously mentioned arrangement is enclosed by an external transmission element 60 and therefore forms the tensioning unit 20.

Figure 5:
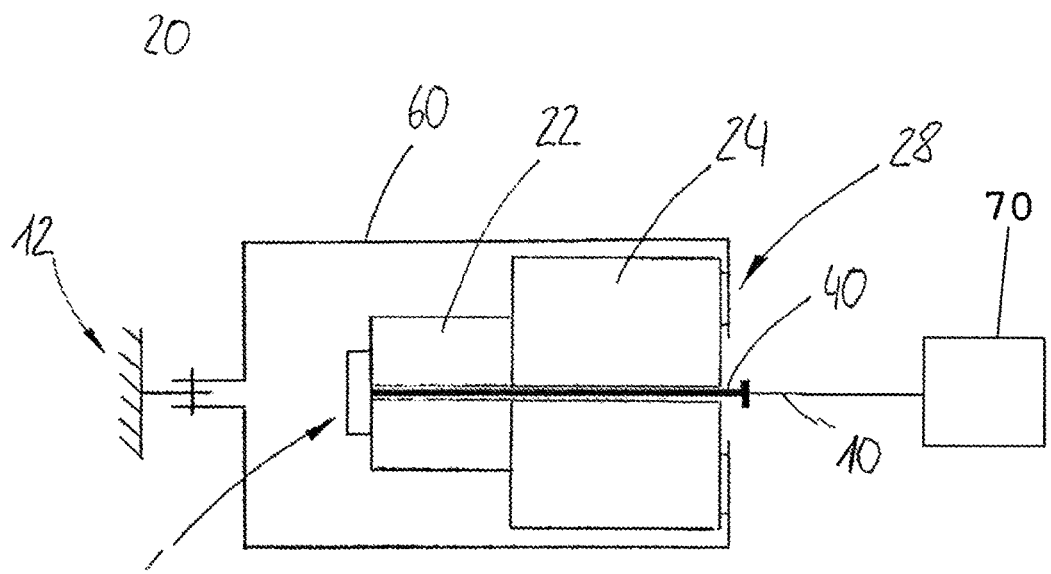
FIG. 5: shows a schematic sketch of a preferred embodiment of a tensioning unit.

FIG. 5 shows a schematic sketch of a preferred embodiment of the tensioning unit 20. The tensioning unit 20 is connected at its left side in FIG. 5 to a fixed point 12 and at its right side to a pull element 10 connected to a solar module 70. FIG. 5 should in particular illustrate the position of the force introduction regions 28. Thus, a retaining force of the left fixed point 12 is transmitted via an external transmission element 60 and via an essentially annular force introduction region 28 to a spring element 24. A tensile force of the pull element 10 is transmitted by an inner transmission element 40, which is passed through the spring element 24 and a tensioning element 22, to the tensioning element 22. Ultimately, both the external transmission element 60 and the inner transmission element 40 are used to correspondingly guide the force introduction region 28 from a pull element 10 or a fixed point 12 or the like to the tensioning element 22 or the spring element 24. Thus, it is not explicitly just the region, point or section, at which a pull element 10 is actually connected to a transmission element 40, 60, which is defined as force introduction region 28, but rather the point, region or section, at which a force of a pull element 10 or a retaining force of a fixed point 12, is transmitted to the tensioning element 22 or the spring element 24.

REFERENCE LIST 10, 10a, 10b Pull element, cable
12 Fixed point
20 Tensioning unit
22 Tensioning element
24 Spring element
26 Boundary element
28 Force introduction region
40 Inner transmission element
42 Guide element 44 Thread
46 Nut
48 Intermediate washer
60 External transmission element
L22 Long tensioning element
L24 Long spring element

The invention claimed is:

1. A tensioning unit arranged between a first pull element and a second pull element the first and second pull elements being cables, wherein the first pull element and/or the second pull element connected to a solar module, comprising:
    a tensioning element;
    a spring element
    an external transmission element being arranged outside of the spring element and the tensioning element and entirely covering both the spring element and the tensioning element; and
    an internal transmission element being arranged inside the spring element and the tensioning element;
    wherein the tensioning element does not abut the external transmission element;
    wherein the tensioning element and the spring element are arranged in a row;
    wherein a length of the tensioning element is shortened in such a manner that the tensioning element has a pretension;
    wherein the pretension is configured to increase the length of the tensioning element;
    wherein the direction of the length enlargement of the tensioning element is directed away from the spring element;
    wherein a length of the spring element is shortened when a force caused by the first pull element is transmitted via the internal transmission element to the spring element; and
    wherein the length of the spring element is shortened when a force caused by the second pull element is transmitted via the external transmission element by the spring element.

2. The tensioning unit according to claim 1, the tensioning element is maximally pretensioned in a mounting state.

3. The tensioning unit according to claim 1, further comprising:
    a boundary element configured to delimit the length reduction of the tensioning element.

4. The tensioning unit according to claim 3, wherein an arrangement of the tensioning element is configured such that a shortening of the length of the spring element is enabled indirectly by at least one of the tensioning element and the boundary element.

5. The tensioning unit according to claim 1, wherein the tensioning element comprises a coil spring.

6. The tensioning unit according to claim 1, wherein the spring element includes at least one disc spring.

7. The tensioning unit according to claim 6, wherein the at least one disc spring comprises a packet of disc springs.

8. The tensioning unit according to claim 1, wherein a spring force of the spring element is larger than a spring force of the tensioning element.

9. The tensioning unit according to claim 8, wherein the spring force of the tensioning element lies in a range from approximately 100 to 400 N, and wherein the spring force of the spring element lies in a range from approximately 500 to 2700 N.

10. The tensioning unit according to claim 1, comprising two force introduction regions configured to introduce at least one of a retaining force and tensile force into the tensioning unit.

11. The tensioning unit according to claim 1, wherein the internal transmission element comprises a setting mechanism for a length change of the tensioning element.

12. The tensioning unit according to claim 11, wherein a guide element is connected to the internal transmission element, which guide element is adapted to a shape of the external transmission element in such a manner that a guiding of the internal transmission element is enabled.

13. The tensioning unit according to claim 1, comprising an external transmission element arranged outside of the spring element and the tensioning element, wherein the internal transmission element is movable relatively to the external transmission element.

14. The tensioning unit according to claim 1, wherein the length change or spring stroke of the tensioning element is longer than that of the spring element.

15. The tensioning unit according to claim 1, wherein the tensioning element has a longer length change and a smaller spring force than the spring element.

* * * * *

UNITED STATES PATENT AND TRADEMARK OFFICE
CERTIFICATE OF CORRECTION

PATENT NO. : 10,337,586 B2
APPLICATION NO. : 14/723010
DATED : July 2, 2019
INVENTOR(S) : Johann Kufner Page 1 of 1

It is certified that error appears in the above-identified patent and that said Letters Patent is hereby corrected as shown below:

In the Specification

Column 1, Lines 17, 25:
"fulfil" should be – fulfill –

Column 5, Line 20:
"10.000" should be – 10,000 –

Column 5, Line 21:
"20.000" should be – 20,000 –

Column 5, Line 22:
"30.000" should be – 30,000 –

Column 7, Line 30:
"3A" (second occurrence) should be – 3B –

In the Claims

Column 9, Claim 1, Line 12:
After "element" insert -- is --

Column 9, Claim 1, Line 15:
After "element" insert -- ; --

Column 10, Claim 13, Line 37:
"relatively" should be – relative –

Signed and Sealed this
Third Day of March, 2020

Andrei Iancu
*Director of the United States Patent and Trademark Office*